United States Patent
Lee et al.

(10) Patent No.: US 6,774,195 B2
(45) Date of Patent: Aug. 10, 2004

(54) CATALYST COMPOSITION AND PROCESS FOR PREPARING NORBORNENE-TYPE HOMOPOLYMERS OR COPOLYMERS

(75) Inventors: Ting-Yu Lee, Kaohsiung (TW); Meei-Yu Hsu, Kaohsiung (TW); Mei-Hua Wang, Tainan Hsien (TW)

(73) Assignee: Industrial Technology Research Institute, Hsinchu (TW)

( * ) Notice: Subject to any disclaimer, the term of this patent is extended or adjusted under 35 U.S.C. 154(b) by 22 days.

(21) Appl. No.: 10/186,977

(22) Filed: Jul. 2, 2002

(65) Prior Publication Data

US 2003/0162922 A1 Aug. 28, 2003

(30) Foreign Application Priority Data

Feb. 27, 2002 (TW) .................................... 91103634 A

(51) Int. Cl.$^7$ ..................... C08F 4/26; C08F 110/14; C08F 210/14
(52) U.S. Cl. ................ 526/172; 502/162; 502/203; 502/213; 502/229; 526/133; 526/171
(58) Field of Search ............... 502/162, 203, 502/213, 229; 526/171, 172, 133, 283

(56) References Cited

U.S. PATENT DOCUMENTS 3,933,770 A * 1/1976 Ikeda et al.
5,344,900 A * 9/1994 Maezawa et al.
5,468,819 A * 11/1995 Goodall et al.

\* cited by examiner

*Primary Examiner*—Caixia Lu
(74) *Attorney, Agent, or Firm*—Sughrue Mion, PLLC

(57) ABSTRACT

A catalyst composition and process for preparing norbornene-type homopolymers or copolymers. The norbornene-type homopolymers or copolymers can be prepared using an in-situ catalyst composition including: (a) a transition metal compound of $ML_4$, wherein M is a Group 10 metal and L is a neutral electron donor ligand; (b) a hydrocarbyl halogen containing a double bond or a triple bond; and (c) a salt of a non or weakly coordinative anion that can replace a halogen bonded to a metal. The catalyst composition is in a mixing state of components (a), (b), and (c), or in a mixing state of a reaction product of components (a) and (b) together with component (c).

21 Claims, 1 Drawing Sheet

Example 3:

Example 4:

Example 5:

CATALYST COMPOSITION AND PROCESS FOR PREPARING NORBORNENE-TYPE HOMOPOLYMERS OR COPOLYMERS

BACKGROUND OF THE INVENTION

1. Field of the Invention

The present invention relates to a catalyst composition for preparing norborene-type homopolymers or copolymers, and more particularly to a process for preparing norborene-type homopolymers or copolymers using an in-situ catalyst composition.

2. Background of the Invention

Polynorbornenes have high temperature resistance and high transparency. In addition, polynorbornenes with particular functional groups are valuable in optoelectronic products. Therefore, it is very important to develop a catalyst suitable for preparing norbornene-type homopolymers and copolymers.

Many researchers have used various metal catalysts to synthesize norbornene-type polymers. For example, Goodall et al. in U.S. Pat. No. 5,468,819 use [allyl-Ni—COD]$^+$ (weakly coordinating anion), wherein COD= cyclooctadiene. Lipian et al. in WO 00/20472 use $[(R')_zM(L')_x(L'')_y]_b[WCA]_d$, wherein $[(R')_zM(L')_x(L'')_y]$ is a cation complex where M represents a Group 10 transition metal; R' represents an anionic hydrocarbyl containing ligand; L' represents a Group 15 neutral electron donor ligand; L" represents a labile neutral electron donor ligand; x is 1 or 2; y is 0, 1, 2, or 3; and z is 0 or 1, wherein the sum of x, y, and z is 4; and [WCA] represents a weakly coordinating counteranion complex; and b and d are numbers representing the number of times the cation complex and weakly coordinating counteranion complex are taken to balance the electronic charge on the overall catalyst complex. A representative example is (allyl)palladium (tricyclohexylphosphine)triflate. Sen et al. in WO 01/21670 use $(L)_2Pd(R)(X)$ and $L'Pd(R)(X)$, wherein L is a monodentate phosphorus or nitrogen ligand, L' is a bidentate phosphorus or nitrogen ligand, X is an anionic group, and R is an alkyl or aryl group. A representative example is $(PPh_3)_2Pd(CH_3)(Br)$.

However, the catalysts used in the above patents are a reaction product of different components. Procedures for isolating the catalyst are required, causing inconvenience.

SUMMARY OF THE INVENTION

The object of the present invention is to provide a catalyst composition for preparing norbornene-type homopolymers or copolymers. The catalyst composition is in a mixing state of each component, rather than an isolated state of the reaction product of each different components.

Another object of the present invention is to provide a process for preparing norbornene-type homopolymers or copolymers. Norbornene-type polymers can be directly synthesized using the above-mentioned catalyst in situ. Since the catalyst composition needs not be isolated and can be directly used in situ, the procedures are simple and costs are saved.

Another object of the present invention is to provide a catalyst product for preparing norbornene-type homopolymers or copolymers. The present invention also provides a process for preparing norbornene-type homopolymers or copolymers using the catalyst product.

To achieve the above-mentioned objects, according to a first aspect of the present invention, the first kind of catalyst composition includes the following components: (a) a transition metal compound of $ML_4$, wherein M is a Group 10 metal and L is a neutral electron donor ligand; (b) a hydrocarbyl halogen containing a double bond or a triple bond; and (c) a salt of a non or weakly coordinative anion that can replace a halogen bonded to a metal. The catalyst composition is in a mixing state of components (a), (b), and (c), or in a mixing state of a reaction product of components (a) and (b) together with component (c).

According to a second aspect of the present invention, the second kind of catalyst composition includes the following components: (a) a transition metal compound of $ML_4$, wherein M is a Group 10 metal and L is a neutral electron donor ligand; and (c) a salt of a non or weakly coordinative anion that can replace a halogen bonded to a metal; and optionally (e) a solvent containing a halogen atom. The catalyst composition is in a mixing state of components (a) and (c), or in a mixing state of components (a), (c), and (e).

The two above-mentioned kinds of catalyst compositions can be used to prepare norbornene-type homopolymers or copolymers in situ.

According to a third aspect of the present invention, the catalyst product is a reaction product of the following components: (a) a transition metal compound of $ML_4$, wherein M is a Group 10 metal and L is a neutral electron donor ligand; (b) a hydrocarbyl halogen containing a triple bond; (c) a salt of a non or weakly coordinative anion that can replace a halogen bonded to a metal; and (d) a proton source provider that can react with an eta-3-propargyl group.

DETAILED DESCRIPTION OF THE INVENTION

Figure 1:
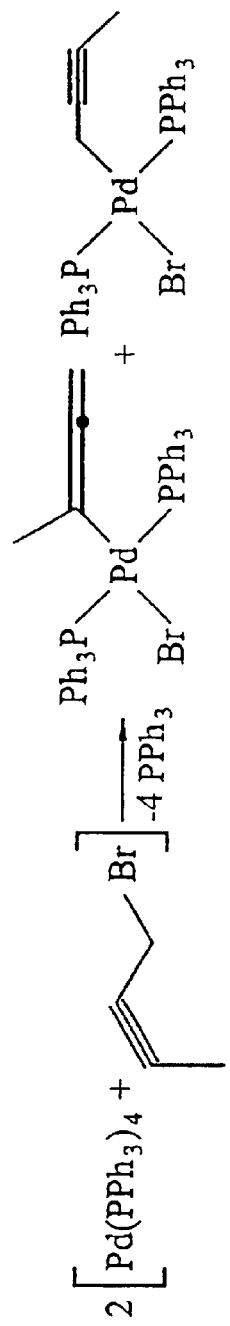
FIG. 1 shows the reaction equations for synthesizing the reaction product of the present invention according to Examples 3 to 5.
Figure 1:
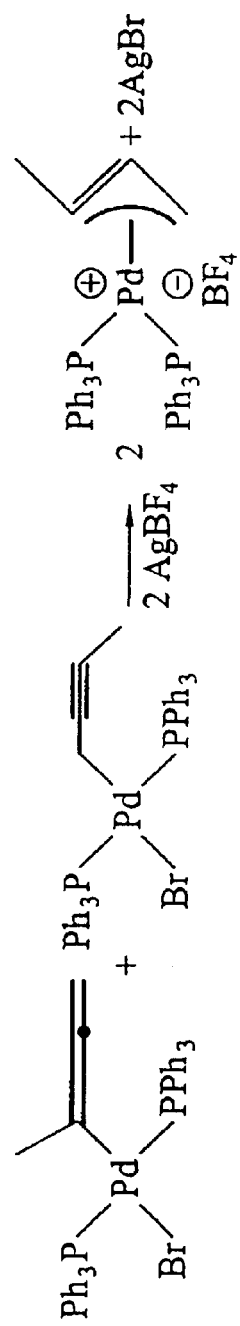
Figure 1:
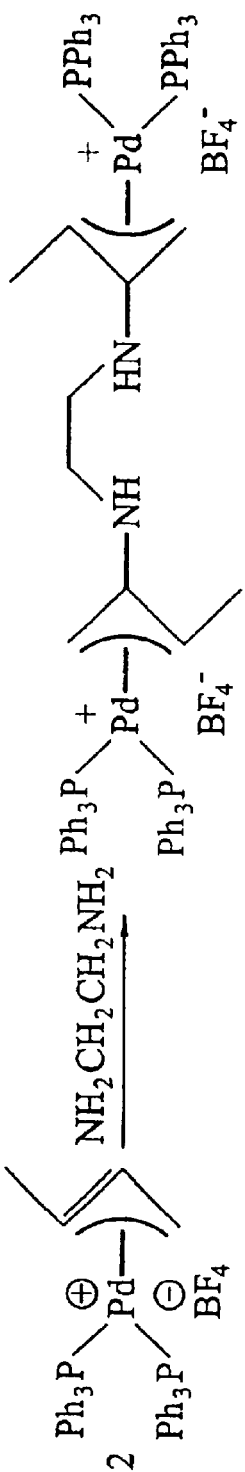

The present invention develops two kinds of catalyst compositions and one kind of catalyst product, all of which are suitable for preparing norbornene-type homopolymers or copolymers.

The first kind of catalyst composition of the present invention includes the following components: (a) a transition metal compound of $ML_4$, wherein M is a Group 10 metal and L is a neutral electron donor ligand; (b) a hydrocarbyl halogen containing a double bond or a triple bond; and (c) a salt of a non or weakly coordinative anion that can replace a halogen bonded to a metal. The catalyst composition is in a mixing state of components (a), (b), and (c), or in a mixing state of a reaction product of components (a) and (b) together with component (c).

The first catalyst composition of the present invention can be used to prepare norbornene-type homopolymers or copolymers in situ. At least one norbornene-type monomer is polymerized in the presence of the catalyst composition. The catalyst composition amount can be 0.02 to 0.2 mole % based on the total monomers amount. The so-called "in situ" indicates that the first catalyst composition of the present invention needs not be purified or isolated in advance, and can be directly used in a mixing state of each component to polymerize the monomer. The so-called mixing state can be a mixing state of components (a), (b), and (c). Or, alternatively, components (a) and (b) can be first reacted, and then the reaction product of components (a) and (b) is mixed with component (c).

In the transition metal compound $ML_4$, L can be triphenylphosphine($PPh_3$), tricyclohexylphosphine($PCy_3$), trio-tolylphosphine [P(o-tol)$_3$], preferably $PPh_3$. Representative examples of $ML_4$ include $Pd(PPh_3)_4$ [tetrakis (triphenylphosphine)palladium(0)], $Ni(PPh_3)_4$, [tetrakis (triphenylphosphine)nickel(0)], $Pt(PPh_3)_4$ [tetrakis (triphenylphosphine)platinum(0)], preferably $Pd(PPh_3)_4$.

According to the present invention, the salt of a non or weakly coordinative anion that can replace a halogen bonded to a metal can be a salt of an alkaline metal (such as lithium) or a salt of silver, preferably a salt of silver. The non or weakly coordinative anion can be $BF_4^-$, $PF_6^-$, $CF_3SO_3^-$, $SbF_6^-$, $B(C_6F_5)_4^-$, $B[C_6H_3(CF_3)_2]_4^-$, $NO_3^-$, and $CH_3COO^-$. Representative examples of the salt include $AgBF_4$, $AgSbF_6$, $LiB(C_6F_5)_4$, silver nitrate, and silver acetate.

According to the present invention, the hydrocarbyl halogen containing a double bond or a triple bond can be reacted with the transition metal compound $ML_4$. When the hydrocarbyl halogen contains a double bond, representative examples include $CH_3CH=CHCH_2Cl$, $CH_2=CCH_3CH_2Cl$, $CH_2=CHCHCH_3Cl$, $CH_2=CHCH_2Cl$, preferably $CH_3CH=CHCH_2Cl$. When the hydrocarbyl halogen contains a triple bond, representative examples include $HCCCH_2Br$(propargyl bromide) and $H_3CCCCH_2Br$(1-bromo-2-butyne).

As to the first catalyst composition of the present invention, when the hydrocarbyl halogen contains a triple bond, the first catalyst composition can further include component (d) a proton source provider that can react with an eta-3-propargyl group. The proton source provider is a nucleophilic group or compound that has a proton/hydride active group. The proton source provider can be an amine and representative examples include $H_2NCH_2CH_2NH_2$ and $HN(C_2H_5)_2$, preferably $H_2NCH_2CH_2NH_2$.

The second catalyst composition of the present invention includes the following components: (a) a transition metal compound of $ML_4$, wherein M is a Group 10 metal and L is a neutral electron donor ligand; (c) a salt containing a non or weakly coordinative anion that can replace a halogen bonded to a metal; and optionally (e) a solvent containing a halogen atom. The catalyst composition is in a mixing state of components (a) and (c), or in a mixing state of components (a), (c), and (e).

The solvent containing a halogen atom can be $CH_2Cl_2$, $C_6H_5Cl$, and $CHCl_3$.

The second catalyst composition of the present invention can also be used to prepare norbornene-type homopolymers or copolymers in situ. At least one norbornene-type monomer is polymerized in the presence of the catalyst composition. The catalyst composition amount can be 0.02 to 0.2 mole % based on the total monomer amount. The so-called "in situ" indicates that the second catalyst composition of the present invention needs not be purified or isolated in advance, and can be directly used in a mixing state of components (a) and (c), or in a mixing state of components (a), (c), and (e) to polymerize the monomer.

The above-mentioned first or second catalyst composition of the present invention can further include a scavenger in order to remove residual donor ligands from transition metal compound $ML_4$), thus increasing catalytic activity. Representative examples of the donor scavenger include $B(C_6H_5)_3$, $Ni(COD)_2$, and CuCl.

The catalyst product of the present invention is a reaction product of the following components: (a) a transition metal compound of $ML_4$, wherein M is a Group 10 metal and L is a neutral electron donor ligand; (b) a hydrocarbyl halogen containing a triple bond; (c) a salt of a non or weakly coordinative anion that can replace a halogen bonded to a metal; and (d) a proton source provider that can react with an eta-3-propargyl group.

In order to make the content of the present invention more fully understood, a representative example is taken to describe the reaction of synthesizing the catalyst product of the present invention. When the transition metal compound $ML_4$ is $Pd(PPh_3)_4$, the triple bond-containing hydrocarbyl halogen is $H_3CCCCH_2Br$, the salt of a non or weakly coordinative anion that can replace a halogen bonded to a metal is $AgBF_4$, the proton source provider is $H_2NCH_2CH_2NH_2$, the synthetic reaction equation is depicted in FIG. 1. The detailed reaction procedures are described in the following Examples 3 to 5.

The first and second catalyst compositions and the catalyst product of the present invention are suitable for use to polymerize at least one norbornene-type monomer, obtaining norbornene-type homopolymers or copolymers. The norbornene-type monomer suitable for use in the present invention is not limited and can be norbornene or norbornene derivatives. A representative example of the norbornene derivative is NB—Si(OMe)$_3$[5-(bicycloheptenyl) trimethoxysilane].

According to the present invention, more than two kinds of norbornene-type monomers can be polymerized to obtain a norbornene-type copolymer using the first or second catalyst compositions or the catalyst product of the present invention. For example, norbornene and NB—Si(OMe)$_3$ are polymerized to obtain a norbornene-type copolymer.

According to the present invention, a norbornene-type monomer and a monomer different from the norbornene can be polymerized using the first or second catalyst compositions or the catalyst product of the present invention. For example, a norbornene-type monomer and an acrylic monomer are polymerized. Suitable acrylic monomer can be t-butyl acrylate (t-BA), butyl methacrylate (BMA), and methyl acrylate (MA).

The following examples are intended to illustrate the process and the advantages of the present invention more fully without limiting its scope, since numerous modifications and variations will be apparent to those skilled in the art.

Preparation Of Catalyst Composition

EXAMPLE 1

Synthesis of $Pd(PPh_3)_4$ 5 g of $PdCl_2$ (28.2 mmol) and 37 g of $PPh_3$ (141 mmol) were charged in DMSO (200 ml) and heated to 140° C. for dissolution. After $PdCl_2$ and $PPh_3$ were dissolved, heating was stopped. After 15 minutes, $H_2NNH_2.H_2O$ (6 ml) was added and stirred at room temperature. The reaction mixture was quickly filtered through an oxygen-free filter. The crude product was washed with degassed ethanol and degassed ether two times respectively, filtered, and dried to collect an yellow powdery solid $Pd(PPh_3)_4$ (31 g, yield=95%)

EXAMPLE 2

Synthesis of $Pd(PPh_3)_2(Br)(\eta^1\text{-}CHCCH_2)$ $Pd(PPh_3)_4$ (5 g, 4.3 mmol) obtained from Example 1 was dissolved in benzene (50 ml), had propargyl bromide (0.8 g, 6.7 mmol) added, and stirred at room temperature for 30 minutes. After the reaction was complete, the reaction mixture was concentrated under reduced pressure to remove most solvent. Ether was slowly added to the reaction mixture to precipitate the product. A yellowish brown solid Pd(PPh$_3$)$_2$(Br)($\eta^1$-CHCCH$_2$) (2.8 g, Yield=87%) was obtained after filtration.

EXAMPLE 3

Synthesis of Pd(PPh$_3$)$_2$(Br)($\eta^1$-C(Me)CCH$_2$)

Pd(PPh$_3$)$_4$ (1 g, 0.86 mmol) obtained from Example 1 was dissolved in benzene (20 ml), had MeCCCH$_2$Br (0.23 g, 1.73 mmol) added, and stirred at room temperature for 30 minutes. After the reaction was complete, the reaction mixture was concentrated under reduced pressure to remove most solvent. Ether was slowly added to the reaction mixture to precipitate the product. A yellowish brown solid Pd(PPh$_3$)$_2$ (Br)($\eta^1$-CH$_2$CCMe)/Pd(PPh$_3$)$_2$(Br)($\eta^1$-C(Me)CCH$_2$) (0.5 g, Yield=76%) was obtained after filtration.

The reaction schemes of Examples 3 to 5 are shown in FIG. 1.

EXAMPLE 4

Synthesis of [Pd(PPh$_3$)$_2$($\eta^3$-CH$_2$CCMe)]BF$_4$

Pd(PPh$_3$)$_2$(Br)($\eta^1$-CH$_2$CCMe)/Pd(PPh$_3$)$_2$(Br)($\eta^1$-C(Me)CCH$_2$) (0.44 g, 0.57 mmol) obtained from Example 3 was dissolved in CH$_2$Cl$_2$ (20 ml). AgBF$_4$ (0.11 g, 0.57 mmol) was added and brownish white AgBr precipitate was quickly formed. After stirring for 15 minutes, AgBr solid was filtered out, and the filtrate was concentrated under reduced pressure to remove most solvent. Ether was slowly added to the residual portion to precipitate the product. A grayish white solid [Pd(PPh$_3$)$_2$($\eta^3$-CH$_2$CCMe)]BF$_4$ (0.34 g, Yield=77%) was obtained after filtration.

EXAMPLE 5

Synthesis of [Pd(PPh$_3$)$_2$($\eta^3$-CH$_2$C(CHMe)(NHCH$_2$—))]$_2$(BF$_4$)$_2$

[Pd(PPh$_3$)$_2$($\eta^3$-CH$_2$CCMe)]BF$_4$ (0.1 g, 0.13 mmol) obtained from Example 4 was dissolved in CH$_2$Cl$_2$ (15 ml). H$_2$NCH$_2$CH$_2$NH$_2$ (4 mg, 0.065 mmol) was added at −35° C. and stirred for 30 minutes. The reaction mixture was concentrated under reduced pressure to remove most solvent. Ether was slowly added to the residual portion to precipitate the product. A brownish white solid [Pd(PPh$_3$)$_2$($\eta^3$-CH$_2$C(CHMe)(NHCH$_2$—))]$_2$(BF$_4$)$_2$ (0.16 g, Yield=75%) was obtained after filtration.

EXAMPLE 6

Synthesis of [Pd(PPh$_3$)$_2$($\eta^3$-CH$_2$C(NEt$_2$)(CHMe))]SbF$_6$

The same procedures as described in Example 4 were employed, except that AgBF$_4$ was replaced by AgSbF$_6$, thus obtaining [Pd(PPh$_3$)$_2$($\eta^3$-CH$_2$CCMe)]SbF$_6$.

Pd(PPh$_3$)$_2$($\eta^3$-CH$_2$CCMe)]SbF$_6$ (0.5 g, 0.566 mmol) was dissolved in CH$_2$Cl$_2$ (20 ml). An excess amount of HNEt$_2$ (0.2 g, 2.74 mmol) was added at −35° C. and stirred for 30 minutes. The reaction mixture was concentrated under reduced pressure to remove most solvent. Ether was slowly added to the residual portion to precipitate the product. A brownish white solid [Pd(PPh$_3$)$_2$($\eta^3$-CH$_2$C(NEt$_2$)(CHMe))]SbF$_6$ (0.34 g, Yield=61%) was obtained after filtration.

Process of Preparing Norbornene-Type Homopolymers and Copolymers
Homopolymerization of Norbornene

EXAMPLE 7

Step 1 (Monomer): 20 ml of purified toluene (20 ml) and 4 ml of norbornene (85 wt %) were charged in a 50 ml reactor.

Step 2 (Catalyst): 0.036 g (0.048 mmol) of Pd(PPh$_3$)$_2$(Br)($\eta^1$-CHCCH$_2$) obtained from Example 2 was dissolved in 3 ml of CH$_2$Cl$_2$ in a 20 ml sample vessel. 0.016 g (0.082 mmol) of AgBF$_4$ was dissolved in 2 ml of CH$_2$Cl$_2$ in a 5 ml sample vessel. The AgBF$_4$ solution was added dropwise to the Pd(PPh$_3$)$_2$(Br)($\eta^1$-CHCCH$_2$) solution and stirred for 20 minutes.

Step 3: The catalyst solution obtained from step 2 was injected into the monomer solution with a syringe. After the reaction was complete, methanol was added to the reaction mixture to precipitate the product. After filtration and drying overnight in an oven, the polymer was obtained (0.81 g).

EXAMPLE 8

The same procedures as described in Example 7 were employed, except that AgBF$_4$ was replaced by 0.085 g (0.25 mmol) of AgSbF$_6$ and the solvent was changed to C$_6$H$_5$Cl. The product was 2.28 g.

EXAMPLE 9

Step 1 (Monomer): 20 ml of purified toluene (20 ml) and 4 ml of norbornene (85 wt %) were charged in a 50 ml reactor.

Step 2 (Catalyst): 0.009 g (0.012 mmol) of Pd(PPh$_3$)$_2$(Br)($\eta^1$-CHCCH$_2$) obtained from Example 2 was dissolved in 3 ml of C$_6$H$_5$Cl in a 20 ml sample vessel. 0.007 g (0.02 mmol) of AgSbF$_6$ was dissolved in 2 ml of C$_6$H$_5$Cl in a 5 ml sample vessel. The AgSbF$_6$ solution was added dropwise to the Pd(PPh$_3$)$_2$(Br)($\eta^1$-CHCCH$_2$) solution and stirred for 40 minutes. 0.006 g (0.022 mmol) of Ni(COD)$_2$ was dissolved in 2 ml of toluene and then added to the above solution. Stirring proceeded for 5 minutes.

Step 3: The catalyst solution obtained from step 2 was injected into the monomer solution with a syringe. After the reaction was complete, methanol was added to the reaction mixture to precipitate the product. After filtration and drying overnight, the polymer was obtained (0.23 g).

EXAMPLE 10

Step 1 (Monomer): 20 ml of purified toluene (20 ml) and 4 ml of norbornene (85 wt %) were charged in a 50 ml reactor.

Step 2 (Catalyst): 0.009 g (0.012 mmol) of Pd(PPh$_3$)$_2$(Br)($\eta^1$-CHCCH$_2$) obtained from Example 2 was dissolved in 3 ml of CH$_2$Cl$_2$ in a 20 ml sample vessel. 0.004 g (0.021 mmol) of AgBF$_4$ was dissolved in 2 ml of CH$_2$Cl$_2$ in a 5 ml sample vessel. The AgBF$_4$ solution was added dropwise to the Pd(PPh$_3$)$_2$(Br)($\eta^1$-CHCCH$_2$) solution and stirred for 40 minutes. 0.005 g (0.051 mmol) of CuCl was dissolved in 1 ml of CH$_2$Cl$_2$ and then added to the above solution. Stirring proceeded for 10 minutes.

Step 3: The catalyst solution obtained from step 2 was injected into the monomer solution with a syringe. After the reaction was complete, methanol was added to the reaction mixture to precipitate the product. After filtration and drying overnight in an oven, the polymer was obtained (1.06 g).

EXAMPLE 11

Step 1 (Monomer): 20 ml of purified toluene (20 ml) and 4 ml of norbornene (85 wt %) were charged in a 50 ml reactor.

Step 2 (Catalyst): 0.037 g (0.048 mmol) of Pd(PPh$_3$)$_2$(Br)($\eta^1$-C(Me)CCH$_2$) obtained from Example 3 was dissolved in 3 ml of C$_6$H$_5$Cl in a 20 ml sample vessel. 0.028 g (0.081 mmol) of AgSbF$_6$ was dissolved in 2 ml of C$_6$H$_5$Cl a 5 ml sample vessel. The AgSbF$_6$ solution was added dropwise to the Pd(PPh$_3$)$_2$(Br)($\eta^1$-C(Me)CCH$_2$) solution and stirred for 30 minutes.

Step 3: The catalyst solution obtained from step 2 was injected into the monomer solution with a syringe. After the reaction was complete, methanol was added to the reaction mixture to precipitate the product. After filtration and drying overnight in an oven, the polymer was obtained (1.97 g).

EXAMPLE 12

Step 1 (Monomer): 20 ml of purified toluene (20 ml) and 4 ml of norbornene (85 wt %) were charged in a 50 ml reactor.

Step 2 (Catalyst): 0.037 g (0.048 mmol) of Pd(PPh$_3$)$_2$(Br)($\eta^1$-C(Me)CCH$_2$) obtained from Example 3 was dissolved in 3 ml of CH$_2$Cl$_2$ in a 20 ml sample vessel. 0.016 g (0.082 mmol) of AgBF$_4$ was dissolved in 2 ml of CH$_2$Cl$_2$ a 5 ml sample vessel. The AgBF$_4$ solution was added dropwise to the Pd(PPh$_3$)$_2$(Br)($\eta^1$-C(Me)CCH$_2$) solution and stirred for 40 minutes.

Step 3: The catalyst solution obtained from step 2 was injected into the monomer solution with a syringe. After the reaction was complete, methanol was added to the reaction mixture to precipitate the product. After filtration and drying overnight in an oven, the polymer was obtained (1.27 g).

EXAMPLE 13

Step 1 (Monomer): 20 ml of purified toluene (20 ml) and 4 ml of norbornene (85 wt %) were charged in a 50 ml reactor.

Step 2 (Catalyst): 0.037 g (0.048 mmol) of Pd(PPh$_3$)$_2$(Br)($\eta^1$-C(Me)CCH$_2$) obtained from Example 3 was dissolved in 3 ml of C$_6$H$_5$Cl in a 20 ml sample vessel. 0.028 g (0.081 mmol) of AgSbF$_6$ was dissolved in 2 ml of C$_6$H$_5$Cl in a 5 ml sample vessel. The AgSbF$_6$ solution was added dropwise to the Pd(PPh$_3$)$_2$(Br)($\eta^1$-C(Me)CCH$_2$) solution and stirred for 30 minutes.

Step 3: The catalyst solution obtained from step 2 was injected into the monomer solution with a syringe. After the reaction was complete, methanol was added to the reaction mixture to precipitate the product. After filtration and drying overnight in an oven, the polymer was obtained (1.69 g).

EXAMPLE 14

Step 1 (Monomer): 20 ml of purified toluene (20 ml) and 4 ml of norbornene (85 wt %) were charged in a 50 ml reactor.

Step 2 (Catalyst): 0.037 g (0.048 mmol) of Pd(PPh$_3$)$_2$(Br)($\eta^1$-C(Me)CCH$_2$) obtained from Example 3 was dissolved in 3 ml of CH$_2$Cl$_2$ in a 20 ml sample vessel. 0.016 g (0.082 mmol) of AgBF$_4$ was dissolved in 2 ml of CH$_2$Cl$_2$ in a 5 ml sample vessel. The AgBF$_4$ solution was added dropwise to the Pd(PPh$_3$)$_2$(Br)($\eta^1$-C(Me)CCH$_2$) solution and stirred for 30 minutes.

Step 3: The catalyst solution obtained from step 2 was injected into the monomer solution with a syringe. After the reaction was complete, methanol was added to the reaction mixture to precipitate the product. After filtration and drying overnight in an oven, the polymer was obtained (2.56 g).

EXAMPLE 15

Step 1 (Monomer): 20 ml of purified toluene (20 ml) and 4 ml of norbornene (85 wt %) were charged in a 50 ml reactor.

Step 2 (Catalyst): 0.037 g (0.048 mmol) of Pd(PPh$_3$)$_2$(Br)($\eta^1$-C(Me)CCH$_2$) obtained from Example 3 was dissolved in 3 ml of CH$_2$Cl$_2$ in a 20 ml sample vessel. 0.016 g (0.082 mmol) of AgBF$_4$ was dissolved in 2 ml of CH$_2$Cl$_2$ in a 5 ml sample vessel. The AgBF$_4$ solution was added dropwise to the Pd(PPh$_3$)$_2$(Br)($\eta^1$-C(Me)CCH$_2$) solution and stirred for 30 minutes. 0.022 g (0.08 mmol) of Ni(COD)$_2$ was dissolved in 5 ml of toluene and then added to the above solution. Stirring proceeded for 5 minutes.

Step 3: The catalyst solution obtained from step 2 was injected into the monomer solution with a syringe. After the reaction was complete, methanol was added to the reaction mixture to precipitate the product. After filtration and drying overnight in an oven, the polymer was obtained (2.38 g).

EXAMPLE 16

Step 1 (Monomer): 20 ml of purified toluene (20 ml) and 4 ml of norbornene (85 wt %) were charged in a 50 ml reactor.

Step 2 (Catalyst): 0.037 g (0.048 mmol) of Pd(PPh$_3$)$_2$(Br)($\eta^1$-C(Me)CCH$_2$) obtained from Example 3 was dissolved in 3 ml of CH$_2$Cl$_2$ in a 20 ml sample vessel. 0.016 g (0.082 mmol) of AgBF$_4$ was dissolved in 2 ml of CH$_2$Cl$_2$ in a 5 ml sample vessel. The AgBF$_4$ solution was added dropwise to the Pd(PPh$_3$)$_2$(Br)($\eta^1$-C(Me)CCH$_2$) solution and stirred for 30 minutes. 0.009 g (0.081 mmol) of CuCl was dissolved in 2 ml of CH$_2$Cl$_2$ and then added to the above solution. Stirring proceeded for 10 minutes.

Step 3: The catalyst solution obtained from step 2 was injected into the monomer solution with a syringe. After the reaction was complete, methanol was added to the reaction mixture to precipitate the product. After filtration and drying overnight in an oven, the polymer was obtained (2.19 g).

EXAMPLE 17

Step 1 (Monomer): 20 ml of purified toluene (20 ml) and 4 ml of norbornene (85 wt %) were charged in a 50 ml reactor.

Step 2 (Catalyst): 0.009 g (0.012 mmol) of Pd(PPh$_3$)$_2$(Br)($\eta^1$-C(Me)CCH$_2$) obtained from Example 3 was dissolved in 3 ml of C$_6$H$_5$Cl in a 20 ml sample vessel. 0.007 g (0.02 mmol) of AgSbF$_6$ was dissolved in 2 ml of C$_6$H$_5$Cl in a 5 ml sample vessel. The AgSbF$_6$ solution was added dropwise to the Pd(PPh$_3$)$_2$(Br)($\eta^1$-C(Me)CCH$_2$) solution and stirred for 40 minutes. 0.005 g (0.051 mmol) of CuCl was dissolved in 2 ml of C$_6$H$_5$Cl and then added to the above solution. Stirring proceeded overnight.

Step 3: The catalyst solution obtained from step 2 was injected into the monomer solution with a syringe. After the reaction was complete, methanol was added to the reaction mixture to precipitate the product. After filtration and drying overnight in an oven, the polymer was obtained (1.22 g).

EXAMPLE 18

Step 1 (Monomer): 20 ml of purified toluene (20 ml) and 4 ml of norbornene (85 wt %) were charged in a 50 ml reactor.

Step 2 (Catalyst): 0.044 g (0.038 mmol) of $Pd(PPh_3)_4$ was dissolved in 3 ml of $Et_2O$. 0.015 g (0.126 mmol) of $C_3H_3Br$ was dissolved in 2 ml of $Et_2O$ and was then added to the $Pd(PPh_3)_4$ solution. Stirring proceeded for 1.5 hours. The mixed solution was allowed to stand for 1 minute. The solid in the lower layer was collected and 3 ml of $CH_2Cl_2$ was added. 0.016 g (0.082 mmol) of $AgBF_4$ was dissolved in 2 ml of $CH_2Cl_2$, which was then added dropwise to the above solution. Stirring was conducted for 1 minute.

Step 3: The catalyst solution obtained from step 2 was injected into the monomer solution with a syringe. After the reaction was complete, methanol was added to the reaction mixture to precipitate the product. After filtration and drying overnight in an oven, the polymer was obtained (2.17 g).

EXAMPLE 19

Step 1 (Monomer): 20 ml of purified toluene (20 ml) and 4 ml of norbornene (85 wt %) were charged in a 50 ml reactor.

Step 2 (Catalyst): 0.011 g (0.0095 mmol) of $Pd(PPh_3)_4$ was dissolved in 3 ml of $Et_2O$. 0.004 g (0.033 mmol) of $C_3H_3Br$ was dissolved in 2 ml of $Et_2O$ and was then added to the $Pd(PPh_3)_4$ solution. Stirring proceeded for 1.5 hours. The mixed solution was allowed to stand for 1 minute. The solid in the lower layer was collected and 3 ml of $CH_2Cl_2$ was added. 0.004 g (0.021 mmol) of $AgBF_4$ was dissolved in 2 ml of $CH_2Cl_2$, which was then added dropwise to the above solution. Stirring was conducted for 1 hour. 0.005 g (0.051 mmol) of CuCl was dissolved in 2 ml of $CH_2Cl_2$, added to the above solution, and then stirred for 10 minutes.

Step 3: The catalyst solution obtained from step 2 was injected into the monomer solution with a syringe. After the reaction was complete, methanol was added to the reaction mixture to precipitate the product. After filtration and drying overnight in an oven, the polymer was obtained (1.74 g).

EXAMPLE 20

Step 1 (Monomer): 20 ml of purified toluene (20 ml) and 4 ml of norbornene (85 wt %) were charged in a 50 ml reactor.

Step 2 (Catalyst): 0.011 g (0.0095 mmol) of $Pd(PPh_3)_4$ was dissolved in 3 ml of toluene. 0.004 g (0.033 mmol) of $C_3H_3Br$ was dissolved in 2 ml of toluene and was then added to the $Pd(PPh_3)_4$ solution. Stirring proceeded for 1.5 hours. 0.004 g (0.021 mmol) of $AgBF_4$ was dissolved in 5 ml of $CH_2Cl_2$, which was then added dropwise to the above solution. Stirring was conducted for 1 hour.

Step 3: The catalyst solution obtained from step 2 was injected into the monomer solution with a syringe. After the reaction was complete, methanol was added to the reaction mixture to precipitate the product. After filtration and drying overnight in an oven, the polymer was obtained (1.32 g).

EXAMPLE 21

Step 1 (Monomer): 20 ml of purified toluene (20 ml) and 4 ml of norbornene (85 wt %) were charged in a 50 ml reactor.

Step 2 (Catalyst): 0.011 g (0.0095 mmol) of $Pd(PPh_3)_4$ was dissolved in 3 ml of $Et_2O$. 0.004 g (0.033 mmol) of $C_3H_3Br$ was dissolved in 2 ml of $Et_2O$ and was then added to the $Pd(PPh_3)_4$ solution. Stirring proceeded for 1.5 hours. The mixed solution was allowed to stand for 1 minute. The solid in the lower layer was collected and 3 ml of $CH_2Cl_2$ was added. 0.004 g (0.021 mmol) of $AgBF_4$ was dissolved in 2 ml of $CH_2Cl_2$, which was then added dropwise to the above solution. Stirring was conducted for 1 hour. 0.012 g (0.023 mmol) of $B(C_6F_5)_3$ was dissolved in 1 ml of $CH_2Cl_2$, added to the above solution, and then stirred for 10 minutes.

Step 3: The catalyst solution obtained from step 2 was injected into the monomer solution with a syringe. After the reaction was complete, methanol was added to the reaction mixture to precipitate the product. After filtration and drying overnight in an oven, the polymer was obtained (1.42 g).

EXAMPLE 22

Step 1 (Monomer): 20 ml of purified toluene (20 ml) and 4 ml of norbornene (85 wt %) were charged in a 50 ml reactor.

Step 2 (Catalyst): 0.022 g (0.019 mmol) of $Pd(PPh_3)_4$ was dissolved in 3 ml of $Et_2O$. 0.008 g (0.066 mmol) of $C_3H_3Br$ was dissolved in 2 ml of $Et_2O$ and was then added to the $Pd(PPh_3)_4$ solution. Stirring proceeded for 1 hour. The mixed solution was allowed to stand for 1 minute. The solid in the lower layer was collected and 3 ml of $C_6H_5Cl$ was added. 0.014 g (0.041 mmol) of $AgSbF_6$ was dissolved in 2 ml of $C_6H_5Cl$, which was then added dropwise to the above solution. Stirring was conducted for 3 hours.

Step 3: The catalyst solution obtained from step 2 was injected into the monomer solution with a syringe. After the reaction was complete, methanol was added to the reaction mixture to precipitate the product. After filtration and drying overnight in an oven, the polymer was obtained (1.28 g).

EXAMPLE 23

Step 1 (Monomer): 20 ml of purified toluene (20 ml) and 4 ml of norbornene (85 wt %) were charged in a 50 ml reactor.

Step 2 (Catalyst): 0.011 g (0.0095 mmol) of $Pd(PPh_3)_4$ was dissolved in 3 ml of $Et_2O$. 0.002 g (0.022 mmol) of $C_4H_7Cl$ was dissolved in 2 ml of $Et_2O$ and was then added to the $Pd(PPh_3)_4$ solution. Stirring proceeded for 1.5 hours. The mixed solution was allowed to stand for 1 minute. The solid in the lower layer was collected and 3 ml of $CH_2Cl_2$ was added. 0.004 g (0.021 mmol) of $AgBF_4$ was dissolved in 2 ml of $CH_2Cl_2$, which was then added dropwise to the above solution. Stirring was conducted for 1 hour.

Step 3: The catalyst solution obtained from step 2 was injected into the monomer solution with a syringe. After the reaction was complete, methanol was added to the reaction mixture to precipitate the product. After filtration and drying overnight in an oven, the polymer was obtained (0.37 g).

EXAMPLE 24

Step 1 (Monomer): 20 ml of purified toluene (20 ml) and 4 ml of norbornene (85 wt %) were charged in a 50 ml reactor.

Step 2 (Catalyst): 0.024 g (0.031 mmol) of $[Pd(PPh_3)_2(\eta^3-CH_2CCMe)]BF_4$ obtained from Example 4 was dissolved in 5 ml of $CH_2Cl_2$.

Step 3: The catalyst solution obtained from step 2 was injected into the monomer solution with a syringe. After the reaction was complete, methanol was added to the reaction mixture to precipitate the product. After filtration and drying overnight in an oven, the polymer was obtained (0.24 g).

EXAMPLE 25

Step 1 (Monomer): 20 ml of purified toluene (20 ml) and 4 ml of norbornene (85 wt %) were charged in a 50 ml reactor.

Step 2 (Catalyst): 0.038 g (0.049 mmol) of [Pd(PPh$_3$)$_2$($\eta^3$-CH$_2$CCMe)]BF$_4$ obtained from Example 4 was dissolved in 3 ml of CH$_2$Cl$_2$. 0.022 g (0.08 mmol) of Ni(COD)$_2$ was dissolved in 2 ml of toluene, added dropwise to the above solution, and stirred for 5 minutes.

Step 3: The catalyst solution obtained from step 2 was injected into the monomer solution with a syringe. After the reaction was complete, methanol was added to the reaction mixture to precipitate the product. After filtration and drying overnight in an oven, the polymer was obtained (0.21 g).

EXAMPLE 26

Step 1 (Monomer): 20 ml of purified toluene (20 ml) and 4 ml of norbornene (85 wt %) were charged in a 50 ml reactor.

Step 2 (Catalyst): 0.038 g (0.049 mmol) of [Pd(PPh$_3$)$_2$($\eta^3$-CH$_2$CCMe)]BF$_4$ obtained from Example 4 was dissolved in 3 ml of CH$_2$Cl$_2$. 0.008 g (0.081 mmol) of CuCl was dissolved in 2 ml of CH$_2$Cl$_2$, added dropwise to the above solution, and stirred for 5 minutes.

Step 3: The catalyst solution obtained from step 2 was injected into the monomer solution with a syringe. After the reaction was complete, methanol was added to the reaction mixture to precipitate the product. After filtration and drying overnight in an oven, the polymer was obtained (1.72 g).

EXAMPLE 27

Step 1 (Monomer): 20 ml of purified toluene (20 ml) and 4 ml of norbornene (85 wt %) were charged in a 50 ml reactor.

Step 2 (Catalyst): 0.006 g (0.0078 mmol) of [Pd(PPh$_3$)$_2$($\eta^3$-CH$_2$CCMe)]BF$_4$ obtained from Example 4 was dissolved in 3 ml of C$_6$H$_5$Cl. 0.007 g (0.02 mmol) of AgSbF$_6$ was dissolved in 2 ml of C$_6$H$_5$Cl, added dropwise to the above solution, and stirred for 30 minutes.

Step 3: The catalyst solution obtained from step 2 was injected into the monomer solution with a syringe. After the reaction was complete, methanol was added to the reaction mixture to precipitate the product. After filtration and drying overnight in an oven, the polymer was obtained (0.41 g).

EXAMPLE 28

Step 1 (Monomer): 20 ml of purified toluene (20 ml) and 4 ml of norbornene (85 wt %) were charged in a 50 ml reactor.

Step 2 (Catalyst): 0.006 g (0.0078 mmol) of [Pd(PPh$_3$)$_2$($\eta^3$-CH$_2$CCMe)]BF$_4$ obtained from Example 4 was dissolved in 3 ml of C$_6$H$_5$Cl. 0.005 g (0.026 mmol) of AgBF$_4$ was dissolved in 2 ml of C$_6$H$_5$Cl, added dropwise to the above solution, and stirred for 30 minutes.

Step 3: The catalyst solution obtained from step 2 was injected into the monomer solution with a syringe. After the reaction was complete, methanol was added to the reaction mixture to precipitate the product. After filtration and drying overnight in an oven, the polymer was obtained (0.83 g).

EXAMPLE 29

Step 1 (Monomer): 20 ml of purified toluene (20 ml) and 4 ml of norbornene (85 wt %) were charged in a 50 ml reactor.

Step 2 (Catalyst): 0.022 g (0.014 mmol) of [Pd(PPh$_3$)$_2$($\eta^3$-CH$_2$CCMe)(NHCH$_2$—)]$_2$(BF$_4$)$_2$ obtained from Example 5 was dissolved in 3 ml of CH$_2$Cl$_2$. 0.007 g (0.002 mmol) of AgSbF$_6$ was dissolved in 2 ml of CH$_2$Cl$_2$, added dropwise to the above solution, and stirred for 1 hour.

Step 3: The catalyst solution obtained from step 2 was injected into the monomer solution with a syringe and the reaction proceeded at 50° C. After the reaction was complete, methanol was added to the reaction mixture to precipitate the product. After filtration and drying overnight in an oven, the polymer was obtained (1.52 g).

EXAMPLE 30

Step 1 (Monomer): 20 ml of purified toluene (20 ml) and 4 ml of norbornene (85 wt %) were charged in a 50 ml reactor.

Step 2 (Catalyst): 0.022 g (0.014 mmol) of [Pd(PPh$_3$)$_2$($\eta^3$-CH$_2$CCMe)(NHCH$_2$—)]$_2$(BF$_4$)$_2$ obtained from Example 5 was dissolved in 3 ml of C$_6$H$_5$Cl. 0.007 g (0.002 mmol) of AgSbF$_6$ was dissolved in 2 ml of C$_6$H$_5$Cl, added dropwise to the above solution, and stirred for 1 hour.

Step 3: The catalyst solution obtained from step 2 was injected into the monomer solution with a syringe and the reaction proceeded at 50° C. After the reaction was complete, methanol was added to the reaction mixture to precipitate the product. After filtration and drying overnight in an oven, the polymer was obtained (1.86 g).

EXAMPLE 31

Step 1 (Monomer): 20 ml of purified toluene (20 ml) and 4 ml of norbornene (85 wt %) were charged in a 50 ml reactor.

Step 2 (Catalyst): 0.022 g (0.014 mmol) of [Pd(PPh$_3$)$_2$($\eta^3$-CH$_2$CCMe)(NHCH$_2$—)]$_2$(BF$_4$)$_2$ obtained from Example 5 was dissolved in 3 ml of C$_6$H$_5$Cl. 0.005 g (0.02 mmol) of CuCl was dissolved in 2 ml of C$_6$H$_5$Cl, added dropwise to the above solution, and stirred for 1 hour.

Step 3: The catalyst solution obtained from step 2 was injected into the monomer solution with a syringe and the reaction proceeded. After 1 hour of reaction, 0.012 g (0.023 mmol) of B(C$_6$F$_5$)$_3$ was dissolved in 2 ml of CH$_2$Cl$_2$ and then injected into the above reaction solution for further reaction. After the reaction was complete, methanol was added to the reaction mixture to precipitate the product. After filtration and drying overnight in an oven, the polymer was obtained (0.31 g).

EXAMPLE 32

Step 1 (Monomer): 20 ml of purified toluene (20 ml) and 4 ml of norbornene (85 wt %) were charged in a 50 ml reactor.

Step 2 (Catalyst): 0.022 g (0.014 mmol) of [Pd(PPh$_3$)$_2$($\eta^3$-CH$_2$CCMe)(NHCH$_2$—)]$_2$(BF$_4$)$_2$ obtained from Example 5 was dissolved in 3 ml of CH$_2$Cl$_2$. 0.012 g (0.023 mmol) of B(C$_6$F$_5$)$_3$ was dissolved in 2 ml of CH$_2$Cl$_2$, added dropwise to the above solution, and stirred for 1 hour.

Step 3: The catalyst solution obtained from step 2 was injected into the monomer solution with a syringe and the reaction proceeded. After the reaction was complete, methanol was added to the reaction mixture to precipitate the product. After filtration and drying overnight in an oven, the polymer was obtained (0.26 g).

EXAMPLE 33

Step 1 (Monomer): 20 ml of purified toluene (20 ml) and 4 ml of norbornene (85 wt %) were charged in a 50 ml reactor.

Step 2 (Catalyst): 0.014 g (0.014 mmol) of [Pd(PPh$_3$)$_2$ ($\eta^3$-CH$_2$C(NEt$_2$)CMe)]SbF$_6$ obtained from Example 6 was dissolved in 5 ml of CH$_2$Cl$_2$.

Step 3: The catalyst solution obtained from step 2 was injected into the monomer solution with a syringe and the reaction proceeded. After the reaction was complete, methanol was added to the reaction mixture to precipitate the product. After filtration and drying overnight in an oven, the polymer was obtained (0.018 g).

EXAMPLE 34

Step 1 (Monomer): 20 ml of purified toluene (20 ml) and 4 ml of norbornene (85 wt %) were charged in a 50 ml reactor.

Step 2 (Catalyst): 0.028 g (0.028 mmol) of [Pd(PPh$_3$)$_2$ ($\eta^3$-CH$_2$C(NEt$_2$)(CMe))]SbF$_6$ obtained from Example 6 was dissolved in 3 ml of CH$_2$Cl$_2$. 0.010 g (0.01 mmol) of CuCl was dissolved in 2 ml of CH$_2$Cl$_2$, added dropwise to the above solution, and stirred for 30 minutes.

Step 3: The catalyst solution obtained from step 2 was injected into the monomer solution with a syringe. After the reaction was complete, methanol was added to the reaction mixture to precipitate the product. After filtration and drying overnight in an oven, the polymer was obtained (0.21 g).

EXAMPLE 35

Step 1 (Monomer): 20 ml of purified toluene (20 ml) and 4 ml of norbornene (85 wt %) were charged in a 50 ml reactor.

Step 2 (Catalyst): 0.014 g (0.014 mmol) of [Pd(PPh$_3$)$_2$ ($\eta^3$-CH$_2$C(NEt$_2$)(CMe)]SbF$_6$ obtained from Example 6 was dissolved in 3 ml of CH$_2$Cl$_2$. 0.007 g (0.02 mmol) of AgSbF$_6$ was dissolved in 2 ml of CH$_2$Cl$_2$, added dropwise to the above solution, and stirred for 1 hour.

Step 3: The catalyst solution obtained from step 2 was injected into the monomer solution with a syringe. After the reaction was complete, methanol was added to the reaction mixture to precipitate the product. After filtration and drying overnight in an oven, the polymer was obtained (1.76 g).

EXAMPLE 36

Step 1 (Monomer): 20 ml of purified toluene (20 ml) and 4 ml of norbornene (85 wt %) were charged in a 50 ml reactor.

Step 2 (Catalyst): 0.011 g (0.0095 mmol) of Pd(PPh$_3$)$_4$ was dissolved in 3 ml of CH$_2$Cl$_2$. 0.005 g (0.026 mmol) of AgBF$_4$ was dissolved in 2 ml of CH$_2$Cl$_2$, added dropwise to the above solution, and stirred for 30 minutes.

Step 3: The catalyst solution obtained from step 2 was injected into the monomer solution with a syringe. After the reaction was complete, methanol was added to the reaction mixture to precipitate the product. After filtration and drying overnight in an oven, the polymer was obtained (0.49 g).

EXAMPLE 37

Step 1 (Monomer): 20 ml of purified toluene (20 ml) and 4 ml of norbornene (85 wt %) were charged in a 50 ml reactor.

Step 2 (Catalyst): 0.011 g (0.0095 mmol) of Pd(PPh$_3$)$_4$ was dissolved in 3 ml of C$_6$H$_5$Cl. 0.005 g (0.026 mmol) of AgBF$_4$ was dissolved in 2 ml of C$_6$H$_5$Cl, added dropwise to the above solution, and stirred for 30 minutes.

Step 3: The catalyst solution obtained from step 2 was injected into the monomer solution with a syringe. After the reaction was complete, methanol was added to the reaction mixture to precipitate the product. After filtration and drying overnight in an oven, the polymer was obtained (1.12 g).

EXAMPLE 38

Step 1 (Monomer): 20 ml of purified toluene (20 ml) and 4 ml of norbornene (85 wt %) were charged in a 50 ml reactor.

Step 2 (Catalyst): 0.011 g (0.0095 mmol) of Pd(PPh$_3$)$_4$ was dissolved in 3 ml of toluene. 0.005 g (0.026 mmol) of AgBF$_4$ was dissolved in 2 ml of toluene, added dropwise to the above solution, and stirred for 30 minutes.

Step 3: The catalyst solution obtained from step 2 was injected into the monomer solution with a syringe. After the reaction was complete, methanol was added to the reaction mixture to precipitate the product. After filtration and drying overnight in an oven, the polymer was obtained (0.18 g).

EXAMPLE 39

Step 1 (Monomer): 20 ml of purified toluene (20 ml) and 4 ml of norbornene (85 wt %) were charged in a 50 ml reactor.

Step 2 (Catalyst): 0.011 g (0.0095 mmol) of Pd(PPh$_3$)$_4$ was dissolved in 3 ml of CH$_2$Cl$_2$. 0.007 g (0.02 mmol) of AgSbF$_6$ was dissolved in 2 ml of CH$_2$Cl$_2$, added dropwise to the above solution, and stirred for 30 minutes.

Step 3: The catalyst solution obtained from step 2 was injected into the monomer solution with a syringe and the reaction proceeded at 60° C. After the reaction was complete, methanol was added to the reaction mixture to precipitate the product. After filtration and drying overnight in an oven, the polymer was obtained (1.58 g).

Copolymerization of Norbornene

EXAMPLE 40

Copolymerization of NB and MA

Step 1 (Monomer): 1 ml of purified norbornene (85 wt %) and 4 ml of MA (methyl acrylate) were charged in a 50 ml reactor.

Step 2 (Catalyst): 0.011 g (0.0095 mmol) of catalyst obtained from Example 1 was dissolved in 3 ml of Et$_2$O. 0.004 g (0.033 mmol) of C$_3$H$_3$Br was dissolved in 2 ml of Et$_2$O, added dropwise to the above solution, and stirred for 1 hour. The mixed solution was allowed to stand for 1 minute. The solid in the lower layer was collected and 3 ml of C$_6$H$_5$Cl was added. 0.007 g (0.02 mmol) of AgSbF$_6$ was dissolved in 2 ml of C$_6$H$_5$Cl, added dropwise to the above solution, and stirred for 30 minutes.

Step 3: The catalyst solution obtained from step 2 was injected into the monomer solution with a syringe and the reaction proceeded at 50° C. After 1 hour of reaction, methanol was added to the reaction mixture to precipitate the product. After filtration and drying overnight in an oven, the polymer was obtained (0.421 g).

EXAMPLE 41

Copolymerization of NB and BMA

Step 1 (Monomer): 1 ml of purified norbornene (85 wt %) and 4 ml of BMA (butyl methacrylate) were charged in a 50 ml reactor.

Step 2 (Catalyst): 0.011 g (0.0095 mmol) of catalyst obtained from Example 1 was dissolved in 3 ml of $Et_2O$. 0.004 g (0.033 mmol) of $C_3H_3Br$ was dissolved in 2 ml of $Et_2O$, added dropwise to the above solution, and stirred for 1 hour. The mixed solution was allowed to stand for 1 minute. The solid in the lower layer was collected and 3 ml of $C_6H_5Cl$ was added. 0.007 g (0.02 mmol) of $AgSbF_6$ was dissolved in 2 ml of $C_6H_5Cl$, added dropwise to the above solution, and stirred for 30 minutes.

Step 3: The catalyst solution obtained from step 2 was injected into the monomer solution with a syringe and the reaction proceeded at 50° C. After 1 hour of reaction, methanol was added to the reaction mixture to precipitate the product. After filtration and drying overnight in an oven, the polymer was obtained (0.587 g).

EXAMPLE 42

Copolymerization of NB and t-BA

Step 1 (Monomer): 1 ml of purified norbornene (85 wt %) and 4 ml of t-BA (t-butyl acrylate) were charged in a 50 ml reactor.

Step 2 (Catalyst): 0.011 g (0.0095 mmol) of catalyst obtained from Example 1 was dissolved in 3 ml of $Et_2O$. 0.004 g (0.033 mmol) of $C_3H_3Br$ was dissolved in 2 ml of $Et_2O$, added dropwise to the above solution, and stirred for 1 hour. The mixed solution was allowed to stand for 1 minute. The solid in the lower layer was collected and 3 ml of $C_6H_5Cl$ was added. 0.007 g (0.02 mmol) of $AgSbF_6$ was dissolved in 2 ml of $C_6H_5Cl$, added dropwise to the above solution, and stirred for 30 minutes.

Step 3: The catalyst solution obtained from step 2 was injected into the monomer solution with a syringe and the reaction proceeded at 50° C. After 24 hours of reaction, methanol was added to the reaction mixture to precipitate the product. After filtration and drying overnight in an oven, the polymer was obtained (0.248 g).

EXAMPLE 43

Copolymerization of NB and t-BA

Step 1 (Monomer): 1 ml of purified norbornene (85 wt %) and 4 ml of t-BA (t-butyl acrylate) were charged in a 50 ml reactor.

Step 2 (Catalyst): 0.011 g (0.0095 mmol) of catalyst obtained from Example 1 was dissolved in 3 ml of $Et_2O$. 0.004 g (0.033 mmol) of $C_3H_3Br$ was dissolved in 2 ml of $Et_2O$, added dropwise to the above solution, and stirred for 1 hour. The mixed solution was allowed to stand for 1 minute. The solid in the lower layer was collected and 3 ml of $C_6H_5Cl$ was added. 0.004 g (0.021 mmol) of $AgBF_4$ was dissolved in 2 ml of $C_6H_5Cl$, added dropwise to the above solution, and stirred for 30 minutes.

Step 3: The catalyst solution obtained from step 2 was injected into the monomer solution with a syringe and the reaction proceeded at 50° C. After 1 hour of reaction, methanol was added to the reaction mixture to precipitate the product. After filtration and drying overnight in an oven, the polymer was obtained (0.434 g).

EXAMPLE 44

Copolymerization of NB and NB—Si(OMe)$_3$

Step 1 (Monomer): 1 ml of purified norbornene (85 wt %) and 1 ml of NB—Si(OMe)$_3$ were charged in a 50 ml reactor.

Step 2 (Catalyst): 0.011 g (0.0095 mmol) of $Pd(PPh_3)_4$ was dissolved in 3 ml of $Et_2O$. 0.004 g (0.033 mmol) of $C_3H_3Br$ was dissolved in 2 ml of $Et_2O$, added dropwise to the above solution, and stirred for 1 hour. The mixed solution was allowed to stand for 1 minute. The solid in the lower layer was collected and 3 ml of $C_6H_5Cl$ was added. 0.007 g (0.02 mmol) of $AgSbF_6$ was dissolved in 2 ml of $C_6H_5Cl$, added dropwise to the above solution, and stirred for 30 minutes.

Step 3: The catalyst solution obtained from step 2 was injected into the monomer solution with a syringe. After 2 hours of reaction, methanol was added to the reaction mixture to precipitate the product. After filtration and drying overnight in an oven, the polymer was obtained (2.81 g).

EXAMPLE 45

Step 1 (Monomer): 1 ml of purified norbornene (85 wt %) and 1 ml of NB—Si(OMe)$_3$ were charged in a 50 ml reactor.

Step 2 (Catalyst): 0.011 g (0.0095 mmol) of $Pd(PPh_3)_4$ was dissolved in 3 ml of $Et_2O$. 0.004 g (0.033 mmol) of $C_3H_3Br$ was dissolved in 2 ml of $Et_2O$, added dropwise to the above solution, and stirred for 1 hour. The mixed solution was allowed to stand for 1 minute. The solid in the lower layer was collected and 3 ml of $C_6H_5Cl$ was added. 0.005 g (0.026 mmol) of $AgBF_4$ was dissolved in 2 ml of $C_6HsCl$, added dropwise to the above solution, and stirred for 30 minutes.

Step 3: The catalyst solution obtained from step 2 was injected into the monomer solution with a syringe. After 2 hours of reaction, methanol was added to the reaction mixture to precipitate the product. After filtration and drying overnight in an oven, the polymer was obtained (0.29 g).

The foregoing description of the preferred embodiments of this invention has been presented for purposes of illustration and description. Obvious modifications or variations are possible in light of the above teaching. The embodiments chosen and described provide an excellent illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A catalyst composition for preparing a norbornene homopolymer or copolymer, comprising the following components:

(a) a transition metal compound of $ML_4$, wherein M is a Group 10 metal and L is a neutral electron donor ligand;

(b) a hydrocarbyl halogen containing a double bond or a triple bond; and (c) a salt of a non or weakly coordinative anion that can replace a halogen bonded to a metal, wherein the catalyst composition is in a mixing state of components (a), (b), and (c), or in a mixing state of a reaction product of components (a) and (b) together with component (c).

2. The catalyst composition as claimed in claim 1, wherein the transition metal compound $ML_4$ is $Pd(PPh_3)_4$.

3. The catalyst composition as claimed in claim 1, wherein the salt is a silver salt.

4. The catalyst composition as claimed in claim 1, wherein the hydrocarbyl halogen contains a double bond.

5. The catalyst composition as claimed in claim 4, wherein the hydrocarbyl halogen is $CH_3CH=CHCH_2Cl$.

6. The catalyst composition as claimed in claim 1, wherein the hydrocarbyl halogen contains a triple bond.

7. The catalyst composition as claimed in claim 6, wherein the hydrocarbyl halogen is propargyl bromide ($HCCCH_2Br$) or $H_3CCCCH_2Br$.

8. The catalyst composition as claimed in claim 6, further comprising (d) a proton source provider that can react with an eta-3-propargyl group.

9. The catalyst composition as claimed in claim 8, wherein the proton source provider is $H_2NCH_2CH_2NH_2$ or $HN(C_2H_5)_2$.

10. A process for preparing a norbornene homopolymer or copolymer, comprising polymerizing at least one norbornene monomer in the presence of an in situ catalyst composition, wherein the catalyst composition includes the following components:
    (a) a transition metal compound of $ML_4$, wherein M is a Group 10 metal and L is a neutral electron donor ligand;
    (b) a hydrocarbyl halogen containing a double bond or a triple bond; and
    (c) a salt of a non or weakly coordinative anion that can replace a halogen bonded to a metal,
    wherein the catalyst composition is in a mixing state of components (a), (b), and (c), or in a mixing state of a reaction product of components (a) and (b) together with component (c).

11. The process as claimed in claim 10, wherein the norbornene monomer is norbornene or $NB—Si(OMe)_3$[5 (bicycloheptenyl)trimethoxysilane].

12. The process as claimed in claim 10, wherein the process comprises polymerizing a norbornene monomer and a monomer different from the norbornene.

13. The process as claimed in claim 12, wherein the monomer different from the norbornene is an acrylic monomer.

14. The process as claimed in claim 13, wherein the monomer different from the norbornene is butyl acrylate, butyl methacrylate, or methyl acrylate.

15. A catalyst product for preparing a norbornene homopolymer or copolymer, which is a reaction product of the following components:
    (a) a transition metal compound of $ML_4$, wherein M is a Group 10 metal and L is a neutral electron donor ligand;
    (b) a hydrocarbyl halogen containing a triple bond;
    (c) a salt of a non or weakly coordinative anion that can replace a halogen bonded to a metal; and
    (d) a proton source provider that can react with an eta-3-propargyl group.

16. The catalyst product as claimed in claim 15, wherein the proton source provider is $H_2NCH_2CH_2NH_2$ or $HN(C_2H_5)_2$.

17. A process for preparing a norbornene homopolymer or copolymer, comprising polymerizing at least one norbornene monomer in the presence of a catalyst product, wherein the catalyst product is a reaction product of the following components:
    (a) a transition metal compound of $ML_4$, wherein M is a Group 10 metal and L is a neutral electron donor ligand;
    (b) a hydrocarbyl halogen containing a triple bond;
    (c) a salt of a non or weakly coordinative anion that can replace a halogen bonded to a metal; and
    (d) a proton source provider that can react with an eta-3-propargyl group.

18. A catalyst composition for preparing a norbornene homopolymer or copolymer, comprising the following components:
    (a) a transition metal compound of $ML_4$, wherein M is a Group 10 metal and L is a neutral electron donor ligand; and
    (c) a salt of a non or weakly coordinative anion that can replace a halogen bonded to a metal,
    wherein the catalyst composition is in a mixing state of components (a) and (c).

19. The catalyst composition as claimed in claim 18, further comprising component (e) a solvent containing a halogen atom,
    wherein the catalyst composition is in a mixing state of components (a), (c), and (e).

20. A process for preparing a norbornene homopolymer or copolymer, comprising polymerizing at least one norbornene monomer in the presence of an in situ catalyst composition, wherein the catalyst composition includes the following components:
    (a) a transition metal compound of $ML_4$, wherein M is a Group 10 metal and L is a neutral electron donor ligand; and
    (c) a salt of a non or weakly coordinative anion that can replace a halogen bonded to a metal,
    wherein the catalyst composition is in a mixing state of components (a) and (c).

21. The process as claimed in claim 20, further comprising component (e) a solvent containing a halogen atom,
    wherein the catalyst composition is in a mixing state of components (a), (c), and (e).

* * * * *